United States Patent Office 3,334,141
Patented Aug. 1, 1967

3,334,141
CHLORINE INITIATED LIQUID PHASE OXIDATION OF ALICYCLIC HYDROCARBONS
George J. Schmitt, Madison, John Pisanchyn, Morristown, and Wilbur F. Chapman, Morris Township, Morris County, N.J., assignors to Allied Chemical Corporation, New York, N.Y., a corporation of New York
No Drawing. Filed Nov. 18, 1963, Ser. No. 324,227
7 Claims. (Cl. 260—586)

This invention relates to the oxidation of saturated alicyclic hydrocarbons and in particular cyclohexane. More particularly, this invention relates to a process for oxidizing these hydrocarbons in liquid phase with molecular oxygen-containing gas.

The general procedure for the oxidation of alicyclic hydrocarbons such as cyclohexane is known. In German Patent No. 1,190,659, for example, it is disclosed that cyclohexane may be oxidized by use of a oxygen-nitrogen gas mixture, the oxygen being at 5 volume percent and the reaction temperature and pressure being 158° C. and 10 atmospheres respectively. The cyclohexane charged into the system is 23 liters per hour along with 8800 liters per hour of the gas mixture. In this process, cobalt naphthenate along with benzaldehyde both of which are in catalytic quantities are used as catalysts and initiators for the oxidation reaction. As a result of this process, 6% of the cyclohexane charged is reacted and of the reacted material 69.8% consists of a mixture of cyclohexanone and cyclohexanol. This process, however, while it does provide a method for oxidizing cyclohexane to a one/ol mixture, necessitates the use of catalysts and initiators to provide only a small conversion of the cyclohexane. Therefore, the yield of the cyclohexanone and cyclohexanol mixture constitutes about 70% of the conversion products. Other methods for the oxidization of secondary carbon atoms in hydrocarbons to ketones include use of a bromide such as hydrogen bromide, magnesium bromide or cobalt bromide as a catalyst in the presence of a molecular oxygen-containing gas. These procedures, however, have been found to be commercially insufficient for the oxidation of alicyclic hydrocarbons such as cyclohexane since good yields are obtained only at a very low conversion per pass of gas, i.e. 5 to 10%. This necessitates a tremendous amount of handling to produce a given quantity of the oxidized product. It therefore has become quite advantageous to provide a process which increases the conversion of the alicyclic hydrocarbon without sacrificing the yield.

It is an object of this invention, therefore, to provide a method for oxidizing saturated alicyclic hydrocarbons to a mixture of the corresponding ketone and alcohol whereby use of expensive catalysts and initiators is obviated. It is a still further object of this invention to provide such a process characterized by a higher conversion of the alicyclic hydrocarbon to a mixture of the corresponding ketone and alcohol wherein the ketone/alcohol mixture is not decreased because of the increase in the conversion of the hydrocarbon. It is a still further object of this invention to provide a process wherein the yield of one/ol mixture is about 70% of the reaction products and wherein the conversion of saturated alicyclic hydrocarbon is about 10% or better (preferably 15 to 20%). Other objects and advantages of this invention will become more apparent from the following more complete description and claims.

In accordance with this invention an alicyclic hydrocarbon is heated in its liquid state under pressure with a gaseous mixture of a molecular oxygen-containing gas and chlorine wherein the mol ratio of oxygen to chlorine is at least 50:1 at temperatures of at least 100° C. and preferably above 150° C. The process can be suitably carried out in the absence of light.

At temperatures of above 150° C., excellent yields of the one/ol mixture are obtained, yet, we prefer the temperature be in the range of 160–165° C., with sufficient pressure to keep the hydrocarbon liquid since at these particular temperatures the best conversion of the alicyclic hydrocarbon with the best yield of the corresponding ketone and alcohol mixture has been observed.

It is further preferred that in operating this process the molecular oxygen-containing gas feed rate be about 3000 cc. per minute. This feed rate has been found to supply a constant continuously high amount of oxygen to the system. In this connection it is to be realized that no particular molecular oxygen-containing gas feed rate is essential to successful operation of the process provided, of course, that the ratio of oxygen to chlorine is at least 50:1 (2% chlorine) and preferably less than 2000:1 (0.05% chlorine). If the oxygen to chlorine ratio is, however, less than the 50:1 critical lower limit, say 25:1, the reaction of the alicyclic hydrocarbon tends to form the corresponding alicyclic hydrocarbon chloride, thereby reducing the yield of the one/ol mixture. On the other hand, while the oxygen to chlorine ratio may be as high as 2000:1, the reaction tends to take a longer time for a good conversion of the alicyclic hydrocarbon, since the chlorine is present only in relatively small amounts. This chlorine is essential to initiate the abstraction of a hydrogen atom from the saturated hydrocarbon. The theoretical explanation is that the chlorine gas added to the system in accordance with this invention is employed as an initiator, i.e., to facilitate the abstraction of a hydrogen atom from the nucleus of the saturated alicyclic hydrocarbon and is not intended to partake in the reaction per se. Consequently, if too much chlorine is present relative to the amount of oxygen charged, the chlorine will tend to react to yield an alicyclic hydrocarbon substitution product (in the case of cyclohexane, cyclohexyl chloride) instead of a mixture of oxygen-alicyclic hydrocarbon addition products such as cyclohexanone and cyclohexanol.

In order to more easily illustrate the nature of this invention, the following set of theoretical equations are set forth. These equations represent a theoretical mechanism postulated in order to explain the success of the instant process. In these equations cyclohexane is used to illustrate the reaction of the saturated alicyclic hydrocarbons.

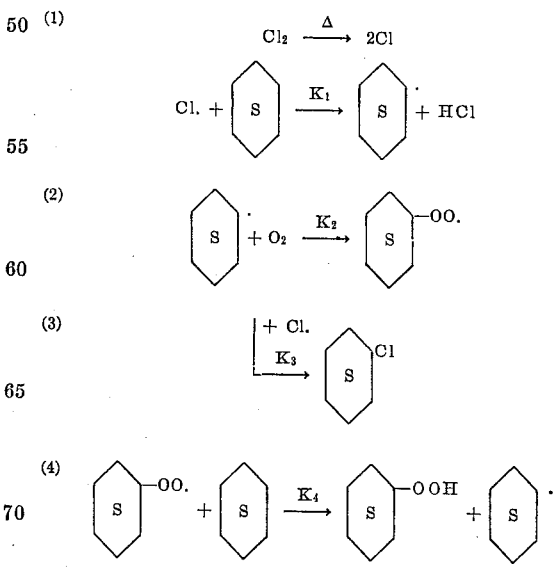

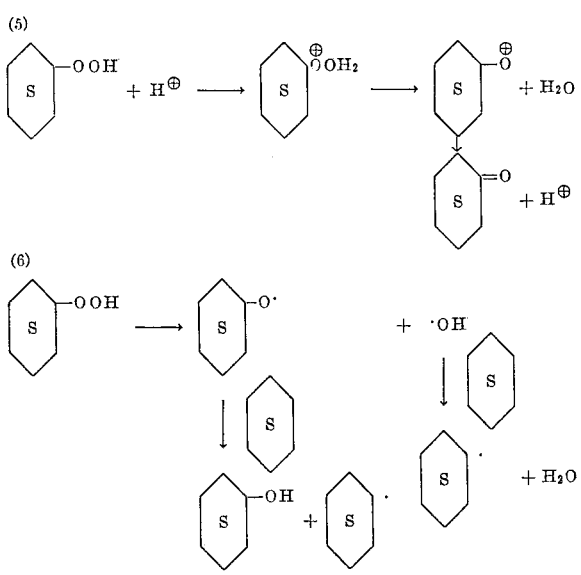

Since these equations represent only a theoretical reaction mechanism, the process of this invention should not be construed only in the light of these equations.

It is the prime objective in the process of our invention to favor reaction No. 2 so as to form the hydroperoxy radical. If the third equation is favored, i.e, the reaction to form the alicyclic hydrocarbon chloride, fewer hydroperoxy radicals will be present for formation of the corresponding hydroperoxide which theoretically subsequently reacts with a positively charged hydrogen atom as in reaction No. 5 which as indicated proceeds to formation of cyclohexanone with regeneration of the positively charged hydrogen atom and formation of water and in Equation 6 wherein cyclohexanol is formed together with water and cyclohexyl radicals which can react in accordance with reaction No. 2.

The chlorine feed rate in our process is not critical so long as the mol ratio of oxygen to chlorine is at least 50:1. In laboratory experiments, however, we have found that chlorine feed rates of between 1.5 and 22 cc. per minute provided good yields in tubular apparatus having a length of 36 inches and a diameter of 3 inches. Of course, the chlorine or oxygen feed rate should be correlated, in the practice of the invention, to the size of the apparatus employed and to other process variables.

The temperature at which the process is performed is critical for the formation of a high yield of the one/ol mixture together with a good conversion, say about 15 to 20% of the alicyclic hydrocarbon. If the temperature of the reaction is less than 100° C., for example at 90–95° C., no detectable amounts of the corresponding ketone and alcohol are formed. However, when cyclohexane is heated at desirable temperatures say between 152° and 158° C., and at a pressure of between 72 and 74 p.s.i.g., there is a suitable mol percent yield of cyclohexanone and cyclohexanol and a satisfactory conversion of the cyclohexane. While these conditions of temperatures, as low as 100° C., are contemplated as being within the scope of the instant invention, the conversion of the alicyclic hydrocarbon is considerably increased, with excellent yields, for example, of cyclohexanone and cyclohexanol when cyclohexane is reacted under the most preferred conditions, i.e., at temperatures of 160–165° C. with sufficient pressure, say about 90 p.s.i.g. or higher. At these conditions the yields were 71.5, 74.2 65.0 mol percent while the conversions were 19.8, 12.5, and 18.4 mol percent respectively. In operating our process we can use temperatures higher than this preferred range, but generally we do not desire to employ temperatures above 200° C. since at these temperatures large and expensive apparatus is required to maintain the alicyclic hydrocarbon liquid.

The only requirement for pressure in the system is that it be sufficient to maintain the liquid saturated alicyclic hydrocarbon in its liquid state. With temperatures of about 152–158° C., pressures of 72–74 p.s.i.g. in the case of cyclohexane have been found to be sufficient. It is to be realized that the amount of necessary pressure is a function of temperature and the saturated alicyclic hydrocarbon.

This reaction may be performed in any suitable reaction vessel capable of maintaining the alicyclic hydrocarbons in a liquid state under pressure and at temperatures of at least 100° C. The reactor is preferably fitted with means for the introduction of molecular oxygen-containing gas and chlorine. It is also preferred that the apparatus have fitted thereto a means for heating the alicyclic hydrocarbon contained therein. An example of a highly suitable means for that purpose is a heating jacket through which a heating oil such as silicone oil may be passed. It is also desirable that the reactor be shaped so that the chlorine and molecular oxygen-containing gas will pass through a large volume of the alicyclic hydrocarbon. Tubular reactors, therefore, are preferred.

In order to more fully illustrate the nature of this invention and the manner of practicing the same the following examples are presented.

*Example 1*

An apparatus was prepared from Pfaudler glass-steel pipe and was rated for 150 p.s.i.g. The apparatus had an inside diameter of 3 inches and a length of 36 inches. It was fitted with a jacket through which silicone oil, a heating oil, was passed to maintain the reaction at a temperature of at least 150° C. After 1950 grams of cyclohexane were charged to the reactor, it was sealed followed by pressurization with oxygen. When the reactor pressure was 89 p.s.i.g. the exit gas needle valve of the reactor was opened just enough to retain this reactor pressure while a slow stream of oxygen 2900–3055 cc. per minute, was passed through the system. This rate was measured by calibrated rotometers. Heat was then applied to the reactor by pumping heated silicone oil through a jacket of the reactor. When the temperature of the oil was 162–164° C., the chlorine feed was begun. The commencement of the introduction of the chlorine gas was considered to be the start of the oxidation period for the reaction. The chlorine was charged at the rate of about 10.5 cc. per minute. The mol percent of chlorine in the feed gas was approximately 0.31–0.36. The oxidation time for this reaction was 3½ hours, after which the chlorine feed was terminated and the oxygen feed reduced. The reactor and contents were then cooled by the circulation of silicone oil which was cooled by the passage of water through coils in the silicone oil heating container. At 55° C. the reactor was emptied by allowing the pressure in the reactor to vent out the product through the bottom of the reactor. The total oxygen charged into the system was between 509–704 liters and the off gas was 509 liters. The total recovery was 2019 g., 1913 g. in the oil phase and 106 g. residue. The total weight gain was 64 g. including the acetone wash residue. Vapor fractometer analysis of the oil phase gave the following results: cyclohexanone wt. percent 11; cyclohexanol wt. percent 6; chlorocyclohexane wt. percent 1, and cyclohexane wt. percent 82. In this run 23.2 mols of cyclohexane were charged, 4.6 mols reacted giving 3.29 mols of cyclohexanone-cyclohexanol mixture in the product. The conversion was 19.8 mol percent and the yield was 71.5 mol percent based on the mols of cyclohexane reacted.

*Example 2*

The apparatus and method were the same as described in Example 1. After 1960 g. of cyclohexane were charged into the reactor it was sealed followed by pressurization with oxygen. When the reactor pressure was 90 p.s.i.g., the exit gas valve was opened just enough to retain this reactor pressure while a slow stream of oxygen, 2750–3430 cc. per minute, was passed through the system. The reactor temperature was 160–165° C. The chlorine was charged together with the oxygen at the rate of 1.5 cc. per minute. The mol percent of chlorine in the feed gas was approximately 0.044–.054. The oxidation time for this run was five hours. Total oxygen charged was 825–1029 liters and the off gas was 781 liters. The total recovery was 2040 g., 1928 g. in the oil phase and 112 g. residue. Vapor fractometer analysis gave the following results: cyclohexanone wt. percent 8; cyclohexanonol wt. percent 3; chlorocyclohexane wt. percent—trace, and cyclohexane wt. percent 89. In this run 23.3 mols of cyclohexane were charged and 2.9 mols reacted giving 2.15 mols of cyclohexanone-cyclohexanol mixture in the product. The conversion was 12.5 mol percent and the yield was 74.2 mol percent.

*Example 3*

The apparatus and method were the same as described in Example 1. After 1980 g. of cyclohexane were charged into the reactor it was sealed followed by pressurization with oxygen. When the pressure was 90 p.s.i.g., the exit gas valve was opened just enough to retain this reactor pressure while a slow stream of oxygen, 3180–3600 cc. per minute, was passed through the system. The reactor temperature was 163–165° C. The chlorine was charged at the rate of 22 cc. per minute. The mol percent of chlorine in the feed gas was approximately 0.61–0.69.

The oxidation time for this run was 3½ hours. Total oxygen charged was 668–756 liters and the off gas was 533 liters. The total recovery was 2122 g., 1815 g. in the oil phase and 211 g. in the residue phase which included 121 g. residue and 90 g. oil. 74 g. water were also produced. Vapor fractometer analysis of the oil phase gave the following results: cyclohexanone wt. percent 7, cyclohexanol wt. percent 4, chlorocyclohexane wt. percent 0.5, cyclohexane wt. percent 88.5.

In this run 23.5 mols of cyclohexane were charged and 4.4 mols reacted giving 2.8 mols of cyclohexanone-cyclohexanol mixture in the product. The conversion was 18.4 mol percent and the yield was 65.0 mol percent.

The foregoing examples are merely illustrative of the manner in which this invention is performed. These examples have used as the alicyclic hydrocarbon cyclohexane but it is to be realized that other alicyclic hydrocarbons, in particular nuclear substituted cyclohexane derivatives such as methyl cyclohexane may be employed without any variation in the manipulative procedure. It is also to be realized that while the foregoing examples used as the oxygen-containing gas pure oxygen that in place of oxygen air, i.e., a mixture of nitrogen and oxygen, can be employed provided that the requisite oxygen to chlorine mol ratio is observed. Naturally when air is employed, a greater volume of oxygen-containing gas will be needed because of the relatively small percent of oxygen contained therein.

It is readily seen therefore that by operating the reaction of an alicyclic hydrocarbon with a molecular oxygen-containing gas in the presence of chlorine under the pressures and temperatures set forth above and within the designated mol ratios of oxygen to chlorine that an excellent conversion, say from 15 to 20%, of the alicyclic hydrocarbon to the corresponding mixture of ketone and alcohol is accomplished. Furthermore, it is seen that by carrying out this oxidation in accordance with the above teachings that at high percentage of the reaction products so obtained constitutes a mixtry of the desired ketone and alcohol. Accordingly, this invention provides an excellent method for oxidizing an alicyclic hydrocarbon in order to obtain from the reaction a good conversion of the hydrocarbon together with an excellent yield of the corresponding mixture of alcohol and ketone.

While certain preferred ranges and embodiments of the invention have been disclosed above, these have been disclosed only for purposes of illustrating the instant invention and are not to be construed as limiting the scope thereof. Since certain modifications and variations will readily appear to one skilled in the art, the instant invention should be construed only in the light of its spirit and scope.

We claim:
1. A process for the oxidation of saturated alicyclic hydrocarbons selected from the group consisting of cyclohexane and methyl cyclohexane to obtain the corresponding alcohol and ketone which comprises heating said alicyclic hydrocarbon in its liquid state under pressure with a gaseous mixture consisting of a molecular oxygen-containing gas and chlorine wherein the mol ratio of oxygen to chlorine is at least 50:1 at temperatures of at least 100° C.
2. A process according to claim 1, wherein said saturated alicyclic hydrocarbon is heated at temperatures of between 100° C. and 200° C.
3. A process according to claim 1, wherein said alicyclic hydrocarbon is heated at temperatures of at least 150° C.
4. A process according to claim 1, wherein said alicyclic hydrocarbon is cyclohexane.
5. A process according to claim 1, wherein said alicyclic hydrocarbon is heated at temperatures between the range of 160 and 165° C.
6. A process according to claim 1, wherein the mol ratio of oxygen to chlorine is between 50:1 and 2000:1.
7. A process according to claim 1, wherein said alicyclic hydrocarbon is methyl cyclohexane.

References Cited

UNITED STATES PATENTS

| | | | |
|---|---|---|---|
| 2,391,740 | 12/1945 | Raley et al. | 260—586 XR |
| 2,712,555 | 7/1955 | Miller | 260—586 XR |
| 3,154,586 | 11/1964 | Bander et al. | 260—586 XR |

OTHER REFERENCES

Morrison et al., "Organic Chemistry" pp. 38 to 41 (1959).

LEON ZITVER, *Primary Examiner.*

M. M. JACOB, *Assistant Examiner.*